US008523270B2

(12) United States Patent
Marlier et al.

(10) Patent No.: US 8,523,270 B2
(45) Date of Patent: Sep. 3, 2013

(54) AUTOMOBILE PROVIDED WITH WHEEL WELL DEFLECTORS

(75) Inventors: Fabien Marlier, Clermont-Ferrand (FR); Jean-Jacques Azam, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/321,453

(22) PCT Filed: May 28, 2010

(86) PCT No.: PCT/EP2010/057391
§ 371 (c)(1),
(2), (4) Date: Dec. 20, 2011

(87) PCT Pub. No.: WO2010/136554
PCT Pub. Date: Dec. 2, 2010

(65) Prior Publication Data
US 2012/0091753 A1    Apr. 19, 2012

(30) Foreign Application Priority Data

May 28, 2009  (FR) ...................................... 09 02590

(51) Int. Cl.
*B62D 25/18* (2006.01)
(52) U.S. Cl.
USPC ......... 296/180.1; 296/198; 280/849; 280/851

(58) Field of Classification Search
USPC ........ 296/198, 180.1, 180.2, 180.4; 280/847, 280/848, 849, 851, 159, 160
See application file for complete search history.

(56) References Cited

U.S. PATENT DOCUMENTS

| 5,651,566 | A  | * | 7/1997  | Arenhold ...................... 280/850 |
| 6,007,102 | A  | * | 12/1999 | Helmus ......................... 280/849 |
| 6,276,746 | B1 | * | 8/2001  | Gentry et al. .............. 296/180.1 |

FOREIGN PATENT DOCUMENTS

| DE | 1 711 873 U   |   | 9/1955  |
| EP | 0 684 178 A1  |   | 11/1995 |
| EP | 0795458 A1    | * | 7/1997  |
| EP | 0 795 458 A1  |   | 9/1997  |
| FR | 2 896 223 A1  |   | 7/2007  |
| FR | 2 897 038 A1  |   | 8/2007  |
| FR | 2897038 A1    | * | 8/2007  |
| JP | 4-176784 A    |   | 6/1992  |
| JP | 8-318876 A    |   | 12/1996 |

* cited by examiner

*Primary Examiner* — Dennis Pedder
*Assistant Examiner* — Beverly Becker
(74) *Attorney, Agent, or Firm* — Fitzpatrick, Cella, Harper & Scinto

(57) ABSTRACT

A motor vehicle includes at least one wheel designed to turn in a well defined by a wheelhouse. The vehicle also includes a wheel deflector of an elongate overall shape extending from the wheelhouse towards the wheel with one end provided with a radius R corresponding substantially to an exterior radius of the wheel. The deflector is arranged in an upper portion of the wheelhouse and extends longitudinally on each side of a median plane of the wheel passing through an axis of rotation of the wheel, with an overall angular length L between $\frac{1}{20}$ and $\frac{1}{4}$ of an external circumference of the wheel.

11 Claims, 2 Drawing Sheets

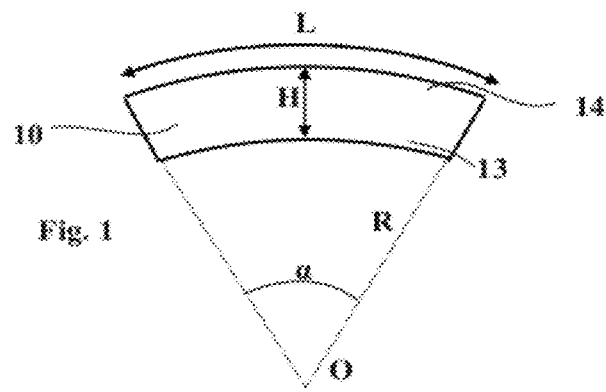
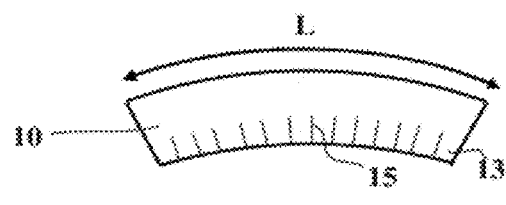
Fig. 1
Fig. 7
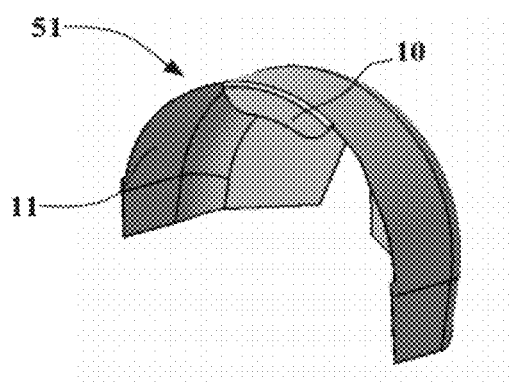
Fig. 8
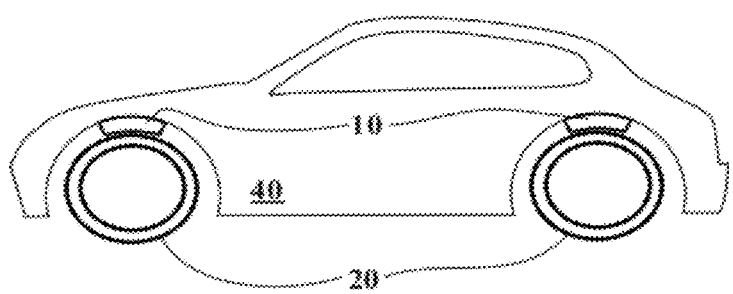
Fig. 9

AUTOMOBILE PROVIDED WITH WHEEL WELL DEFLECTORS

TECHNICAL FIELD OF THE INVENTION

The invention relates to a motor vehicle that includes at least one wheel positioned in a wheelhouse intended to incorporate the wheel substantially therein in a region of the vehicle that is covered by an aerodynamic covering (bodywork), and a device for optimizing the aerodynamic flow at the wheelhouse. The invention also relates to an aerodynamic deflector for a vehicle wheelhouse.

BACKGROUND

Numerous aerodynamic devices are mounted on motor vehicles in order to optimize performance, either to increase road holding or, more often, to reduce drag. Such devices are usually provided at the front or the rear of the vehicle. However, other regions of the vehicle can contribute to creating certain aerodynamic disturbances. Thus, in order to reduce the effects associated with this phenomenon, one of the techniques currently used on certain vehicles is to reduce the impact of such disturbances by incorporating a frontal wheel spoiler or flap. The effect of this spoiler is to reduce flow into the wheelhouse.

FR 2 897 038 discloses an example of an aerodynamic device for a vehicle, the device including a flap designed to deflect the air at the front of a wheel of a vehicle in motion, the flap being movable between a lowered position in which it is deployed towards the ground and a retracted raised position. The device includes means of moving the flap towards the ground and rearwards so that in the deployed position the flap is, near the ground and near the wheel, substantially parallel to the simplified front surface of the wheel. However, the effectiveness of this type of device is limited. Further, it does not prevent the generation of vortices in the rear part of the wheel. Moreover, the fact that it is located very near to the base of the wheel carries certain risks of damage associated with potential impacts against obstacles such as kerbs, stones, foreign bodies of all kinds left on the road surface, etc.

Wheel fairings consisting of plates or panels or other large-sized surfaces positioned in front of the wheel, or in front of a significant portion of the wheel, as described for example in JP 4176784, are also known. In this example, the surface of the fairing occupies practically the entire upper half of the wheel. Such devices have the disadvantage of greatly reducing access to the wheel and/or to the tyre. Thus, it is difficult to carry out a visual inspection of the tyres without either moving the vehicle or removing the fairing, and removing the wheel itself entails first of all removing the fairing.

SUMMARY OF THE INVENTION

In order to avoid such a situation, and notably to avoid the presence of air flows likely to adversely affect the overall aerodynamic performance of motor vehicles, the invention provides a number of technical solutions.

To achieve this, an embodiment of the invention provides a motor vehicle that includes at least one wheel designed to turn in a well defined by bodywork elements including a wheelhouse. This vehicle is characterized in that it also includes a wheel deflector of elongate overall shape extending from the wheelhouse towards the wheel, with one end provided with a radius R corresponding substantially to the exterior radius of the wheel, with the deflector being arranged in the upper portion of the wheelhouse and extending longitudinally on each side of the median plane of the wheel passing through the axis of rotation of the wheel with an overall angular length L between $\frac{1}{20}$ and $\frac{1}{4}$ of the external circumference of the wheel, and with the end of the deflector closest to the wheel being situated axially on the outside relative to the wheel and at most one centimeter on the outside relative to the wheel.

Thanks to this type of arrangement, the air flows circulating in the wheelhouse well cannot leave this well in the upper portion of the wheelhouse. The deflector is advantageously provided in such a way that it occupies the uppermost region of the wheelhouse. The deflector, although it must not be in permanent contact with the tyre, needs preferably to be as close to the latter as possible in order to produce an optimum beneficial effect. The resultant reduction in drag allows the fuel consumption of the vehicle to be reduced.

According to another advantageous embodiment, the end of the deflector is situated radially at most 1 cm on the outside relative to the exterior surface of the wheel, and at most 2 cm radially on the inside relative to the exterior surface of the wheel.

These positions are defined when the vehicle is stationary but under load.

These preferred positions for the end of the deflector relative to the wheel guarantee optimum benefit from the deflector while at the same time limiting any contact between the end and the surface of the wheel. The remaining space between the end of the deflector and the wheel allows for vertical travel of the wheel and turning (steering) if the wheel is a front wheel. It is advantageous for the deflector to be as close as possible to the wheel in order effectively to limit the egress of air flows. This space also makes it possible to maintain easy and practical access to the wheel, if need be, whether this be for a visual inspection or for a removal.

According to an advantageous embodiment, the deflector is made of a sheet of flexible and extensile material, such as a rubbery material.

According to another embodiment, the deflector includes a region made up of a plurality of flexible strips.

These two embodiments allow isolated point contact between the end of the deflector and the exterior surface of the wheel, without damaging consequences.

BRIEF DESCRIPTION OF THE FIGURES

Details of the embodiments are given in the following description supplemented by FIGS. 1 to 9, which are given solely by way of nonlimiting examples, in which identical references indicate elements that are similar, and in which:

FIG. 1 is an enlarged view of one embodiment of a deflector;

FIG. 3 is a schematic cross-sectional view of a wheel in a wheelhouse fitted with a deflector;

FIG. 7 is an enlarged view of a second embodiment of a deflector;

FIG. 8 illustrates one example of a configuration of a piece of bodywork for a vehicle provided with an integrated deflector; and FIG. 9 shows a motor vehicle provided with deflectors according to an aspect of the invention.

DETAILED DESCRIPTION OF EMBODIMENTS OF THE INVENTION

In this document, "motor vehicle" means any of a vehicle of a passenger car type, such as a car, a van, a panel van, or a light truck, a vehicle used for transporting items and goods, such as a truck or a semitrailer, and a vehicle for transporting people, such as a bus.

A direction F is a longitudinal direction corresponding to an axis of forward motion of a vehicle. In relation to a wheel of the vehicle, a radial direction follows a radius of the wheel and is directed from the wheel centre O outwards. An axial direction is parallel to an axis of rotation X of the wheel and is oriented from inside of the vehicle towards outside of the vehicle.

FIG. 1 is a head-on view of a first embodiment of a deflector 10. This deflector 10 is of elongate and arched overall shape with a small thickness. In the example shown, the deflector 10 is of a thin semi-annular shape. It is made of a flexible and supple material, such as a rubbery material. It extends from an outer part 14 towards an end 13 while being inscribed inside an angular sector of angle α. The end 13 has a radius of curvature R. The outer part 14 has an angular dimension of length L. The deflector 10 extends from its outer part 14 as far as its end 13 over a height H.

Figure 2:
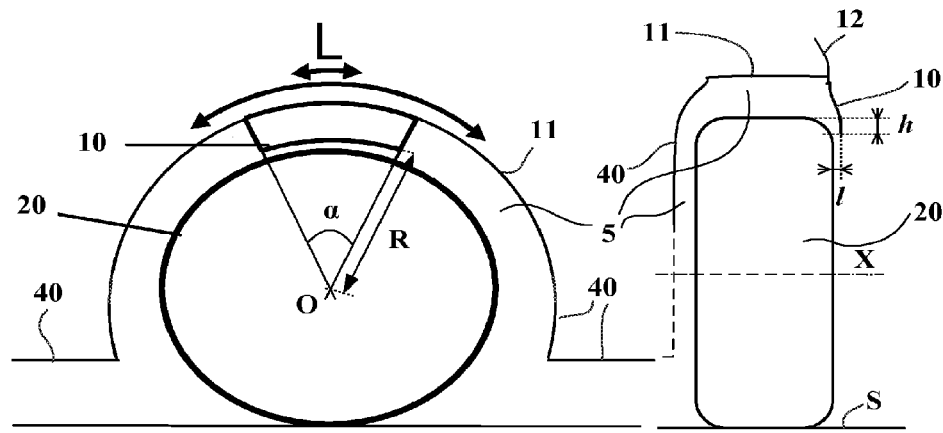
FIG. 2 is a highly schematic side view of a wheel in a wheelhouse provided with a deflector.

FIGS. 2 and 3 very schematically illustrate one exemplary implementation of such a deflector 10 on a wheelhouse 11 of a vehicle. FIG. 2 is a side view and FIG. 3 is a cross sectional view. A wheel 20 is depicted, housed in a well 5 defined by bodywork 40 elements including a wheelhouse 11. The wheelhouse 11, as illustrated more specifically in FIG. 8, is a piece of bodywork of semi-cylindrical overall shape. The deflector 10 is fixed to bodywork 40 of the vehicle at an upper region of the wheelhouse 11, for example at a joint between a wing 12 and the wheelhouse 11. This deflector 10 is aimed at modifying air flows around the wheel 20 in order to reduce aerodynamic drag of the vehicle.

FIGS. 2 and 3 show a characteristic position and dimensions of the deflector 10 according to an aspect of the invention in relation to the corresponding wheelhouse 11. Thus, a surface of the deflector 10 closes off an uppermost region of the well 5 defined by the wheelhouse 11, with at least one portion of the deflector 10 being located substantially vertically in line with the centre O of the wheel 20.

The deflector 10 is configured so that the angular dimension of length L allows an upper part of the wheel 20 to be covered. Advantageously, the length L has a value of between 1/20 and 1/4 of the circumference or external perimeter P of the wheel 20. The end 13 of the deflector 10 has a radius of curvature R, which corresponds substantially to the exterior radius of the wheel 20. FIG. 3 illustrates a precise positioning of the deflector 10. The upper part 14 of the deflector 10 is fixed to the bodywork 40 in a region where the wing 12 and the wheelhouse 11 meet. The deflector 10 is fixed axially, preferably in an axially exterior region of the wheelhouse 11 so that it axially closes off the well 5 on the outside. This means that any axial egress of airflow from the well 5 in the uppermost region of the well 5 is prevented. Attachment may be achieved by bonding, riveting, welding, screw-fastening, etc. This attachment may be done from the outside or from the inside.

For effective closing-off, the end 13 of the deflector 10 is positioned an axial distance l from an exterior sidewall of the wheel 20. This distance l is less than 1 cm. Typically, this distance l is between 2 and 8 mm. Likewise, the end 13 is positioned a radial distance h away from the wheel 20; h is between −2 cm and +1 cm. These small distances make the deflector 10 very effective. During running, the deflector 10 may happen to come into contact with the wheel 20, but its supple and extensile construction means that such contact does not cause any damage.

According to one embodiment illustrated in FIG. 7, the end 13 of the deflector 10 is made up of a plurality of thin and highly flexible strips. These strips promote light contact between the deflector 10 and the wheel 20 without appreciably reducing the closing-off effectiveness of the deflector 10. The deflector 10 may then be made of plastic, metal, a composite such as fibreglass, carbon fibre, or the like, which may or may not be reinforced, etc.

Figure 4:
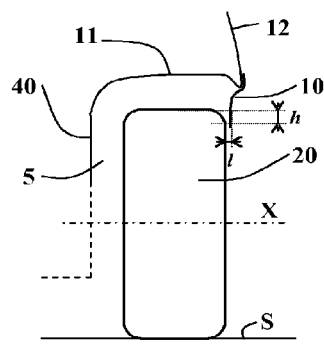
FIG. 4 is a schematic view similar to FIG. 3 of another embodiment of a deflector.
Figure 5:
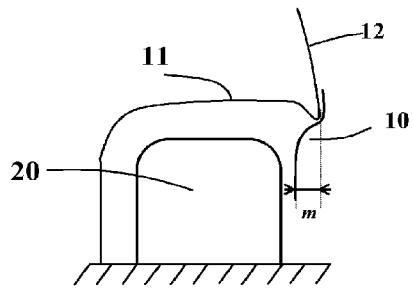
FIG. 5 is a partial enlargement of FIG. 4.

FIGS. 4 and 5 illustrate, in cross section, a fitting of a deflector 10 according to an aspect of the invention. It should be noted that mudflaps extend axially outwards relative to the exterior sidewall of the wheel 20 in the case of passenger vehicles.

The deflector 10 illustrated in FIG. 4 is attached where the wheelhouse 11 and the wing 12 of the vehicle meet. This deflector 10 extends radially inwards and axially inwards towards the wheel 20 so that the distance l between the end 13 of the deflector 10 and the exterior sidewall of the wheel 20 is less than 10 mm and preferably is between 2 and 8 mm. As illustrated in FIG. 5, the end 13 of the deflector 10 is axially offset inwards by a distance m relative to an end of the wing 12.

Figure 6:
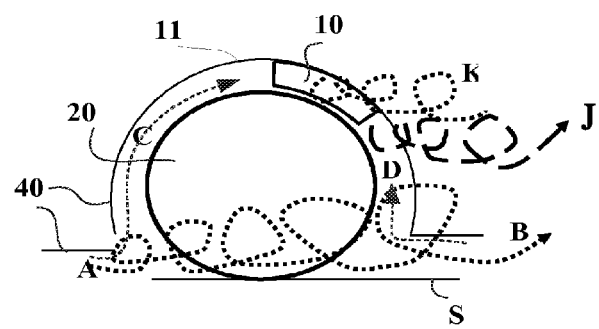
FIG. 6 is a schematic depiction of a deflector according to an aspect of the invention, positioned in an upper portion of a wheelhouse and showing the aerodynamic flows involved.

FIG. 6 is a partial lateral view of a wheelhouse 11 of a vehicle, in which the wheelhouse 11 is fitted with a deflector 10, illustrating air flows that occur as the vehicle runs along. The arrow F indicates a direction of travel of the vehicle along the ground S.

Typical behaviour of the air flows in the region of the wheelhouse 11 is illustrated very schematically. Flow reaching point A splits into two main flows: the first continues axially on each side of the tyre (point B), while the second is sucked up into the well 5 (region C) of the wheelhouse 11. At the rear of the wheel 20, part of the flow is sucked up into the wheelhouse 11 via a depression effect, at zone D. The two flows both flow through the well 5, but in opposite directions. They interact and as a result, in this region of interaction, the two flows re-emerge on a side of the vehicle, as illustrated by flow K, which corresponds to a situation in which there is no deflector 10.

The deflector 10 is designed to cause the aerodynamic flow of air made up of the two opposing flows C and D to re-emerge as close as possible to the ground rather than in the upper portion of the wheel 20. An example is illustrated in FIG. 6 by the arrow J. Tests have shown that fitting deflectors on wheels like that shown makes it possible to obtain improvements in the order of 2% in aerodynamic efficiency (drag).

In FIG. 2, the deflector 10 is positioned almost symmetrically in relation to a median plane of the wheel 20 passing through an axis of rotation X. In FIG. 6, the position of the deflector 10 is markedly offset towards the rear of the vehicle. A person skilled in the art will easily, after completing a number of tests, be able to determine the ideal length and position for the deflector 10 for a given vehicle and a given wheelhouse.

The deflector 10 covers the upper region of the wheelhouse and thus is able to channel the flow and cause it to re-emerge further downstream, around zone D. When L is greater than P/4, there is no significant effect on effectiveness. There is then a surplus or excess of deflector material, which is not only unnecessary from an aerodynamic standpoint, as it has no significant effect on the flows, but it is also found firstly that the fairing or deflector becomes difficult to fit because of the risks of repeated contact with the wheel, and secondly that removal of the wheel becomes more complicated because a large fairing or deflector impedes removal of the wheel, unlike a fairing of more modest size.

Finally, it should be noted that when the dimension L is less than P/20, the device begins to exhibit a loss of effectiveness. P is the perimeter of the wheel.

According to an alternative form of the embodiment depicted in FIG. 8, the deflector 10 may form an integral part of a piece 51 that forms the wheelhouse 11.

The deflector 10 is then incorporated into an element of the piece 51, such that a shape of an external cutout thereof incorporates the aerodynamic deflector 10 at the upper part of the wheelhouse 11. This one-piece component forming the piece 51 in addition to performing the functions associated with those of the deflector 10, performs functions of a conventional wheelhouse. This then is a particularly simple, reliable, and economical way of producing a deflector.

A 2% saving in overall vehicle drag was measured for a vehicle fitted with deflectors on all the wheelhouses. This saving was established by taking the customary vehicle fuel consumption measurements when driving along a given route.

FIG. 4 shows a motor vehicle fitted with deflectors 10 according to an embodiment of the invention. Deflectors can also be used on heavy vehicles, as defined earlier.

The figures and descriptions thereof given hereinabove illustrate embodiments of the invention rather than restricting it. In particular, aspects of the invention and its various alternative forms have just been described in relation with one particular example in which a deflector positioned at the front and at the rear of a vehicle.

Nonetheless, it is obvious to a person skilled in the art that the invention can be extended to other embodiments in which, as alternatives, deflectors are provided only for the front wheels of a vehicle. In another alternative form, the deflectors are provided in several slightly spaced or nesting or partially overlapping parts or sections.

The reference signs in the claims are entirely nonlimiting. The verbs "comprise" and "include" do not exclude the presence of elements other than those listed in the claims. The words "a/an/one" preceding an element do not exclude the presence of a plurality of such elements.

The invention claimed is:

1. A motor vehicle comprised of a body formed of bodywork elements that include:
    a wheelhouse forming a well in which a wheel of the vehicle turns while the vehicle is running; and
    a deflector of elongate overall shape extending from the wheelhouse towards the wheel, with an end portion of the deflector being provided with a radius R corresponding substantially to an exterior radius of the wheel,
    wherein the deflector is arranged at an upper portion of the wheelhouse, and has an overall angular length L between $1/20$ and $1/4$ of an external circumference P of the wheel, and
    wherein the end portion of the deflector closest to the wheel is situated axially relative to the wheel at a distance l of at most 1 cm from a plane of an exterior surface of the wheel.

2. The vehicle according to claim 1, wherein the end portion of the deflector closest to the wheel is situated axially relative to the wheel at the distance l of between 2 mm and 8 mm from the plane of the exterior surface of the wheel.

3. The vehicle according to claim 1, wherein the end portion of the deflector closest to the wheel is situated outside of the wheelhouse.

4. The vehicle according to claim 1, wherein the end portion of the deflector closest to the wheel is situated inside of the wheelhouse.

5. The vehicle according to claim 1, wherein the end portion of the deflector is situated radially relative to the wheel at a distance h of between −2 cm and 1 cm from a plane at an exterior circumference of the wheel.

6. The vehicle according to claim 1, wherein the deflector is positioned symmetrically with respect to a median plane passing vertically through an axis of rotation X of the wheel.

7. The vehicle according to claim 1, wherein the deflector is asymmetrically positioned to be offset with respect to a median plane passing vertically through an axis of rotation X of the wheel.

8. A vehicle according to claim 1, wherein the deflector is made of a sheet of flexible and extensile material.

9. A vehicle according to claim 1, wherein the deflector includes a region formed of a plurality of flexible strips.

10. A vehicle according to claim 1, wherein the deflector and the wheelhouse are integrally formed.

11. A vehicle according to claim 1, wherein the end portion of the deflector closest to the wheel is positioned outwardly of the plane of the exterior surface of the wheel.

* * * * *